(12) United States Patent
Nefcy et al.

(10) Patent No.: US 8,540,604 B1
(45) Date of Patent: Sep. 24, 2013

(54) TRANSMISSION CONTROL DURING REGENERATIVE BRAKING

(75) Inventors: Bernard D. Nefcy, Novi, MI (US);
Daniel Scott Colvin, Farmington Hills, MI (US); Marvin Paul Kraska, Dearborn, MI (US); Walter Joseph Ortmann, Saline, MI (US); Mark Steven Yamazaki, Canton, MI (US); Fazal Urrahman Syed, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/421,356

(22) Filed: Mar. 15, 2012

(51) Int. Cl.
*H02P 17/00* (2006.01)

(52) U.S. Cl.
USPC .......................................................... 477/15

(58) Field of Classification Search
USPC .......................................................... 477/15
See application file for complete search history.

(56) References Cited

U.S. PATENT DOCUMENTS

| | | | |
|---|---|---|---|
| 5,720,690 A * | 2/1998 | Hara et al. | 477/20 |
| 6,434,466 B1 | 8/2002 | Robichaux et al. | |
| 6,636,787 B2 * | 10/2003 | Yamaguchi et al. | 701/22 |
| 6,687,593 B1 | 2/2004 | Crombez et al. | |
| 7,481,738 B2 * | 1/2009 | Kanafani et al. | 477/110 |
| 7,841,433 B2 * | 11/2010 | Soliman et al. | 180/65.265 |
| 7,957,881 B2 | 6/2011 | Itoh | |
| 7,971,666 B2 | 7/2011 | Yamazaki et al. | |
| 7,971,669 B2 | 7/2011 | Gieray et al. | |
| 8,006,790 B2 * | 8/2011 | Kimura et al. | 180/65.6 |
| 8,135,526 B2 * | 3/2012 | Minarcin et al. | 701/70 |
| 8,145,397 B2 * | 3/2012 | Heap et al. | 701/51 |
| 8,197,385 B2 * | 6/2012 | Matsubara et al. | 477/15 |
| 8,204,664 B2 * | 6/2012 | Minarcin et al. | 701/70 |
| 8,296,002 B2 * | 10/2012 | Kumazaki et al. | 701/22 |
| 8,332,090 B2 * | 12/2012 | Rutquist et al. | 701/22 |
| 2011/0066308 A1 | 3/2011 | Yang et al. | |
| 2012/0265382 A1 * | 10/2012 | Nefcy et al. | 701/22 |

* cited by examiner

*Primary Examiner* — Dirk Wright
(74) *Attorney, Agent, or Firm* — David B. Kelley; Brooks Kushman P.C

(57) ABSTRACT

A system and method for controlling a hybrid electric vehicle during regenerative braking is provided. The system and method include a brake controller adapted to cause, for a selected transmission gear, a first torque ratio to be applied to a regenerative brake system during regenerative braking and a second torque ratio, different from the first torque ratio, to be applied when the vehicle is not regenerative braking. The first torque ratio results in an increased braking torque generated by the regenerative brake system compared with application of the second torque ratio.

9 Claims, 3 Drawing Sheets

US 8,540,604 B1

TRANSMISSION CONTROL DURING REGENERATIVE BRAKING

TECHNICAL FIELD

This disclosure relates to control of transmissions in hybrid vehicles during regenerative braking.

BACKGROUND

Hybrid electric vehicles (HEV's) utilize a combination of an internal combustion engine and an electric motor to provide the power needed to propel the vehicle. This arrangement provides improved fuel economy over a vehicle that has only an internal combustion engine.

HEV's also capture and store energy when the vehicle is experiencing powertrain braking. The electric motor functions as a generator when powertrain braking is performed. When the electric motor functions as a generator, the generator absorbs energy generated as a result of the powertrain braking and converts the energy to electric energy which may be used to increase the state of charge of a battery. Regenerative powertrain braking may be desirable beyond recouping energy because the hybrid electric vehicle's energy may be dissipated with minimal or no negative torque supplied by the frictional wheel brakes—thus reducing wear on the frictional wheel brakes.

During vehicle operation, the HEV may require frictional braking when the driver's braking demand exceeds the powertrain braking capability or when the battery is already charged to capacity.

SUMMARY

A system and method for controlling a hybrid electric vehicle is provided. In one embodiment of the invention, a brake controller, for a selected transmission gear, applies a first torque ratio to be applied to the regenerative brake system during regenerative braking. The controller applies a second torque ratio different from the first torque ratio to the transmission when the vehicle is not regenerative braking. Application of the first torque ratio results in an increased braking torque generated by the regenerative brake system compared with application of the second torque ratio.

In another embodiment, the system and method include collecting and storing regenerative energy by the regenerative brake system. The first torque ratio increases an amount of regenerative energy collected when the vehicle is regenerative braking.

According to another embodiment, the method and system include wherein production of the second torque ratio results in an increased regenerative braking capacity relative to production of the first torque ratio.

In a further embodiment, the system and method includes a torque converter connected between to electric machine and a transmission. For the selected gear of the transmission, while the torque converter is locked, the transmission produces the first torque ratio when the electric machine is generating, and produces the second torque ratio different than the first torque ratio, when the electric machine is motoring.

In an alternate embodiment, the system and method applies the first torque ratio when a commanded transmission output torque is negative and applies the second torque ratio when the commanded transmission output torque is positive.

According to another embodiment, the first torque ratio is greater than the second torque ratio.

Embodiments according to the present disclosure may provide various advantages. For example, systems and methods for controlling a hybrid electric vehicle during regenerative powertrain braking according to the present disclosure may performed may be performed to decelerate the hybrid vehicle even for an extended period to further reduce usage of mechanical wheel braking operations. In addition, regenerative powertrain braking operations may be performed for longer durations to charge the battery to capacity which may improve fuel economy and reduce emissions.

The above advantages and other advantages and features will be readily apparent from the following detailed description of representative embodiments when taken in connection with the accompanying drawings.

DETAILED DESCRIPTION

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
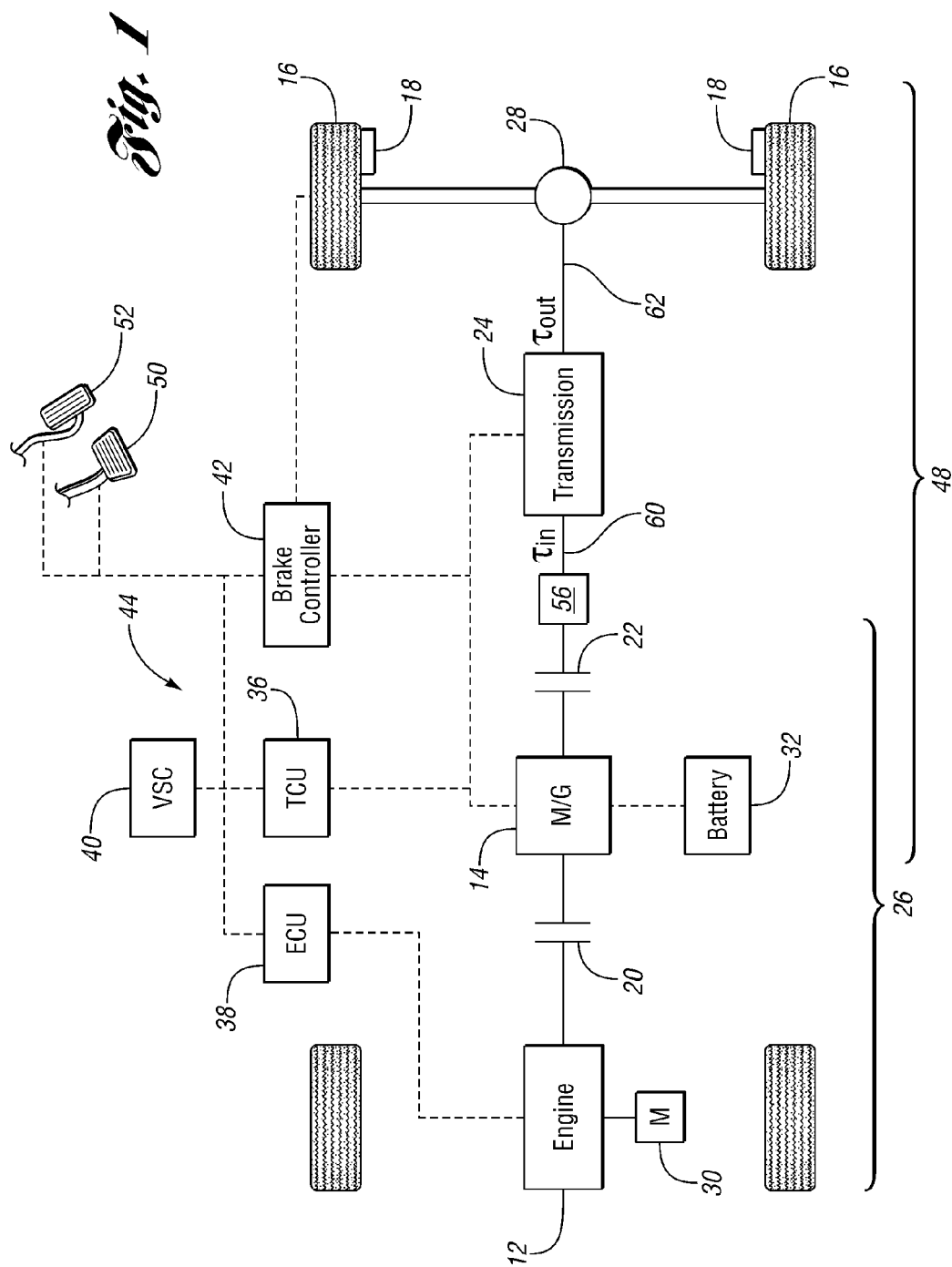
FIG. 1 is a schematic view of a hybrid vehicle according to an embodiment of the disclosure.

FIG. 1 illustrates a schematic diagram of a hybrid vehicle 10 according to an embodiment of the disclosure. The vehicle 10 includes an engine 12, and an electric machine, which, in the embodiment shown in FIG. 1, is a motor generator (M/G) 14, and alternatively may be a traction motor. The M/G 14 is configured to transfer torque to the engine 12 or to the vehicle wheels 16. Each of the wheels 16 may include a friction brake device 18.

The M/G 14 is connected to the engine 12 using a first clutch 20, also known as a disconnect clutch or the upstream clutch. A second clutch 22, also known as a launch clutch or the downstream clutch, connects the M/G 14 to a transmission 24, and all of the input torque to the transmission 24 must flow through the launch clutch 22. The launch clutch 22 can be controlled to isolate the driveline 26, which includes the M/G 14 and the engine 12, from the transmission 24, differential 28 and the vehicle drive wheels 16. Although the clutches 20, 22 are described and illustrated as hydraulic clutches, other types of clutches, such as electromechanical clutches may also be used. Alternatively, the clutch 22 may be replaced with a torque converter and bypass clutch.

In the embodiment illustrated in FIG. 1, the transmission 24 is disposed between the M/G 14 and vehicle drive wheels 16. The M/G 14 can operate as a motor to provide torque to the vehicle wheels 16, and can also operate as a generator, receiving torque from the engine 12 and/or vehicle wheels 16, thereby charging a battery 32.

While FIG. 1 shows one example of a hybrid vehicle powertrain configuration, various other hybrid configurations are also contemplated. With regards to a full series type hybrid powertrain system, the engine may be operated to generate a form of energy suitable for use by the one or more motors. For example, with a full series type hybrid electric vehicle, the engine may generate electricity via a motor/generator that may be used to power an electric motor for propelling the vehicle. With regards to a parallel type hybrid propulsion system, the engine and one or more motors may be operated independently of each other. As one example, an engine may be operated to provide torque to the drive wheels, while a motor may be selectively operated to add or remove torque delivered to the wheels. As another example, the engine may be operated without the motor or the motor may be operated without the engine. Further, in addition to the embodiment in FIG. 1 it is also contemplated that the hybrid electric vehicle may have with either series or parallel type hybrid powertrain systems, or combinations thereof to cooperatively generate electric power as well as output torque.

The engine 12 is a direct injection engine. Alternatively, the engine 12 may be another type of engine or prime mover, such as a port injection engine, a fuel cell, or a second electric machine. The engine 12 may use various fuel sources, such as diesel, biofuel, natural gas, hydrogen, or the like.

In some embodiments, the vehicle 10 also includes a starter motor 30 operatively connected to the engine 12, for example, through a belt or gear drive. The starter motor 30 may be used to provide torque to start the engine 12 without the addition of torque from the M/G 14. This allows the upstream clutch 20 to isolate the M/G 14 during engine 12 start and may eliminate or reduce torque disturbances that would otherwise occur if torque is transferred from the M/G 14 to the engine 12 to assist the engine start.

The M/G 14 is in communication with a battery 32. The battery 32 may be a high voltage battery. The M/G 14 may be configured to charge the battery 32 in a regeneration mode, for example when a driver demands negative wheel torque, through regenerative powertrain braking, or the like. In one example the battery 32 is configured to connect to an external electric grid, such as for a plug-in electric hybrid vehicle (PHEV) with the capability to recharge the battery from an electric power grid, which supplies energy to an electrical outlet at a charging station.

In some embodiments, the transmission 24 is an automatic transmission and connected to the drive wheels 16 in a conventional manner, and may include a differential 28. The vehicle 10 is also provided with a pair of non-driven wheels, however, in alternative embodiments, a transfer case and a second differential can be utilized in order to positively drive all of the vehicle wheels.

The M/G 14 and the clutches 20, 22 may be located within a motor generator case 34 which may be incorporated into the transmission 24 case, or alternatively, is a separate case within the vehicle 10. The transmission 24 has a gear box to provide various gearing ratios for the vehicle 10. The transmission 24 gearbox may include clutches and planetary gear sets, or other arrangements of clutches and gear trains as are known in the art.

The transmission 24 is controlled using a transmission control unit (TCU) 36 to operate on a shift schedule, such as a production shift schedule, that connects and disconnects elements within the gear box to control the ratio between the transmission output and transmission input. The TCU 36 also acts to control the M/G 14, the clutches 20, 22, and any other components within the motor generator case 34.

The engine 12 output shaft is connected to the disconnect clutch 20, which in turn is connected to the input shaft for the input shaft to the M/G 14. The M/G 14 output shaft is connected to the launch clutch 22, which in turn is connected to the transmission 24. In the embodiment illustrated in FIG. 1, the components of driveline 26 of the vehicle 10 are positioned sequentially in series with one another.

An engine control unit (ECU) 38 is configured to control the operation of the engine 12. A vehicle system controller (VSC) 40 transfers data between the TCU 36 and ECU 38. The VSC is also in communication with various sensors for detecting the operating conditions of the engine 12 and transmission 24 such as throttle position sensors, mass air flow sensors, oxygen sensors, manifold pressure sensors or any other powertrain sensors for determining driver input and operating conditions of the battery 32 and M/G 14.

The VSC 40 may also communicate with or include a brake controller 42. The brake controller 42 may be connected with a variety of sensors including brake pedal sensors, accelerator pedal sensors or wheel speed sensors or any other brake system sensors. The brake controller 42 may control and operate friction brakes 18 for mechanical braking of the wheels 16. The brake controller 42 may also control the regenerative brake system 48. The regenerative brake system may include the M/G 14 driven by and driving the wheels 16 of an HEV and the battery 32.

The control system 44 for the vehicle 10 may include any number of controllers, and may be integrated into a single controller, or have various control modules. Some or all of the controllers may be connected by a controller area network (CAN) or other system. The control system 44 may be configured to control operation of the various components of the transmission 24, the motor generator assembly 34, the starter motor 30 and the engine 12 under any of a number of different conditions. For example, the control system 44 may control operation of the various systems and components in a way that minimizes or eliminates torque disturbances and impact to the driver.

Under normal powertrain conditions, the VSC 40 interprets the driver's demands, such as acceleration deceleration demand and then determines the wheel torque command based on the driver demand, powertrain and battery limits. In addition, the VSC 40 determines how much torque each power source needs to provide in order to meet the driver's torque demand, in order to maintain state of charge of the battery 32, and to achieve the operating point (torque and speed) of the engine 12.

Some hybrid electric vehicle configurations may control the engine 12, transmission 24, M/G 14 or any combination thereof, to provide powertrain braking during a braking request from the operator. A braking request may include any operator request to brake the vehicle during a braking event. Therefore a braking request from the operator may include depressing the brake pedal 50 for greater braking or merely releasing the accelerator pedal 52 during gradual or lower braking events.

As discussed above, when the M/G 14 provides powertrain braking, the M/G 14 creates negative torque to slow the vehicle during a braking period. In turn, M/G 14 generates electric energy (e.g. charge (Q) or current (I)) from braking the vehicle which may be transferred to the battery 32. When M/G 14 functions as the generator, kinetic or potential energy of the vehicle is converted to electric energy in order to brake the vehicle. This operation may be known as regenerative braking. In a HEV, regenerative powertrain braking may also be considered a type of powertrain braking.

However, regenerative braking may be limited by the state of charge of the battery 32. In particular, during a braking period the battery 32 may be charged to capacity and cannot accept any additional energy. In other words, regenerative powertrain braking may be performed as long as the battery 32 state of charge is not substantially full. Therefore, when a regenerative powertrain braking event is in progress in a HEV, it may be important to determine the amount of torque received by the M/G 14 from the transmission 24 so that the amount of powertrain braking and the amount of regenerative energy captured can be accurately accounted for to allow the battery 32 to recapture as much energy as possible. Accurately accounting for the amount of regenerative energy captured through powertrain braking may allow HEV's to have smaller capacity batteries, thereby saving space and cost.

In addition, accurately accounting for the amount of regenerative energy captured through powertrain braking may also allow regenerative powertrain braking period to be extended. Extending regenerative powertrain braking operation may further reduce wear on the friction wheel brakes 18, increase vehicle fuel efficiency, increase the amount of energy stored by the battery and decrease vehicle emissions. Extending regenerative braking may also improve driver perceptions and HEV feel when the vehicle is required to switch between regenerative powertrain braking and friction braking since the vehicle may be required to switch between the two braking functions less often when regenerative powertrain braking is extended.

Figure 2:
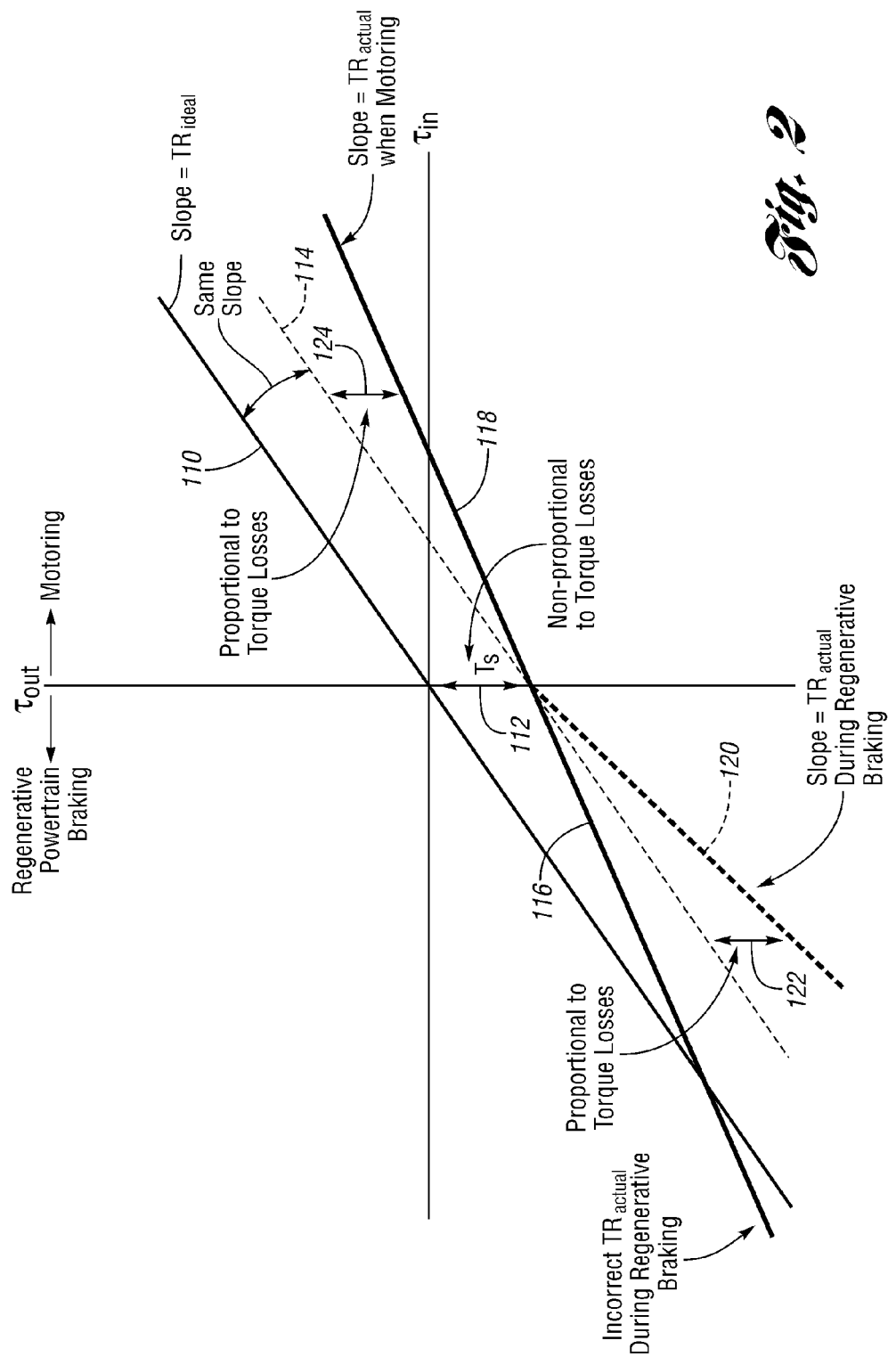
FIG. 2 is a graph illustrating operating characteristics of the transmission of FIG. 1 according to an embodiment of the disclosure.

During regenerative powertrain braking events, torque from the wheels 16 is transmitted to the M/G 14 through the transmission 24. However, the amount of torque received by the M/G 14 is a function of the gear ratio and losses in the transmission 24. Turning to FIG. 2, the torque, gear ratio and losses of the transmission 24 are represented graphically. The ideal gear ratio of the transmission 24 is equal is a ratio of the torque input ($\tau_{in}$) and torque output ($\tau_{out}$), where $\tau_{in}$ is the torque at the input shaft 60 and $\tau_{out}$ is the torque at the output shaft 62. The ideal gear ratio may also be considered an ideal torque ratio. For example, if the gear ratio is 4:1, for a +100 Nm input torque $\tau_{in}$, the output torque $\tau_{out}$ would be 400 Nm. Therefore, the ideal torque ratio is represented by line 110 in FIG. 2 where the slope of the line is the ideal torque ratio.

Traditionally, the torque input to torque output is a linear relationship where the linear line can be described with the formula:

$$y=m*x+b$$

where y is output torque and x is input torque. The slope m is the torque ratio output/input and b is therefore the output torque when the input torque is zero.

Ideally without losses, the slope would be the ideal torque ratio and the offset would be zero. The slope with no losses is the ideal torque ratio. Therefore, the formula for the line 110 is:

$$\tau_{out}=(\tau_{in}*TR_{ideal}) \quad \text{Equation (1)}$$

However, the transmission 24 is not perfectly efficient and has some losses. The losses in the transmission may be a function of friction, heat, spin losses or many other factors. The losses in the transmission may be characterized as 'proportional losses' and 'non-proportional losses'. 'Proportional losses' are essentially a slope which varies as a function of the current gear and speed, whereas 'non-proportional losses' are independent of torque. The efficiency for a step ratio transmission 24 is usually measured across the transmission 24 with a torque converter 56 locked, or modeled without a torque converter.

Therefore, the intercept b is equal to the 'non-proportional loss' $T_s$ illustrated at 112 in FIG. 2. Line 114. Line 114 illustrates the ideal torque ratio when accounting for non-proportional losses $T_s$. Therefore, the formula for the line 114 is:

$$\tau_{out}=(\tau_{in}*TR_{ideal})-T_s \quad \text{Equation (2)}$$

Proportional transmission losses must also be accounted for. The actual torque ratio of the transmission 24 of $\tau_{out}$ to $\tau_{in}$ can be measured empirically in different gears. The empirical modeling of the transmission 24, without the torque converter 56 (locked, or not included), allows for representation of the 'proportional to torque' losses separate from 'non-proportional to torque' losses. The slope with proportional losses is equal to the actual torque ratio. By knowing the ideal torque ratio and torque input-output relationship and measuring only a few points of the actual torque ratio input-output relationships, the difference between the slopes of the ideal torque ratio and the actual torque ratio can be determined. Then, by subtracting off the portion of $\tau_{in}$ that comes from the difference in the slopes between the ideal torque ratio and the actual torque ratio, we can account for the proportional torque losses. The linear formula for the transmission when accounting for proportional and non-proportional losses, shown as line 116 in FIG. 2, could be written as:

$$\tau_{out}=(\tau_{in}*TR_{ideal})-T_s-\tau_{in}*(TR_{ideal}-TR_{actual}) \quad \text{Equation (3A)}$$

Cancelling out the terms in the loss equation, the formula for line 116 in FIG. 2 can be simplified as:

$$\tau_{out}=(\tau_{in}*TR_{actual})-T_s \quad \text{Equation (3B)}$$

For example for a +100 Nm input torque, actual torque ratio of 4.0, ideal torque ratio of 4.1, and non-proportional loss of 5 the $\tau_{out}$ may be determined as:

$$\tau_{out}=(100*4.1)-5-(100*(4.1-4.0))=395 \text{ Nm} \quad \text{Using Equation (3A)}$$

$$\tau_{out}=(100*4.0)-5=395 \text{ Nm} \quad \text{Using Equation (3B)}$$

Next power can be determined by knowing that power is equal to torque multiplied by the speed of the shafts 60, 62, illustrated by the equation:

$$P=\tau*\omega$$

Using an input speed of 400 rad/sec, we can determine the power calculations.

$$P_{in}=100*400=40,000 \text{ Watts}$$

$$P_{out}=395*(400/4.1)=38,536 \text{ Watts}$$

The difference between the power at the transmission input 60 and the transmission output 62 is the amount of power loss because of transmission inefficiencies.

$$P_{in}-P_{out}=1,464 \text{ Watts}$$

The loss formulas in Equation (3) can accurately describe the transmission including losses in a traditional powertrain. The loss formulas in Equation (3) can also accurately describe the transmission including losses in a HEV powertrain when the vehicle 10 is motoring. However, the problem comes when the vehicle 10 is putting power into the transmission output 62 and extracting it from the transmission input 60, such as during regenerative powertrain braking in a HEV. In this situation, the torque values are negative. The loss formulas in Equation (3) do not apply the same when the torque values are negative.

The problem with the loss formulas in Equation (3) during regenerative powertrain braking can be illustrated by another example. For example, for negative torques, where the input torque $\tau_{in}$ is −100 Nm input torque, the actual ratio is 4.0, the ideal ratio is 4.1, and non-proportional losses ($T_s$) 5 the following $\tau_{out}$ is found:

$$\tau_{out}=(-100*4.1)-5-(100*(4.1-4.0))=-405 \text{ Nm} \quad \text{Using Equation (3A)}$$

$$\tau_{out}=(-100*4.0)-5=-405 \text{ Nm} \quad \text{Using Equation (3B)}$$

Using an input speed of 400 rad/sec, we can determine the power calculations:

$$P_{in}=-100*400=-40,000 \text{ Watts}$$

$$P_{out}=-405*(400/4.1)=-39,512 \text{ Watts}$$

$$P_{in}-P_{out}=P_{loss}=-488 \text{ Watts}$$

Using the standard formulas arrives at a negative loss calculation, which is impossible. For example, it is impossible that 40,000 Watts of regenerative energy are collected at the transmission input 60 when only 39,512 Watts of regenerative energy is going into the transmission output 62 from the wheels 16. The power going in the transmission output 62 is smaller than the power coming out of the transmission input 60 to the battery 32, which is impossible.

For regenerative braking events, two lines fit the data better than one line. The first line, illustrated as line 118 in FIG. 2, is for positive output torque $\tau_{out}$ and input torque $\tau_{in}$ when the vehicle 10 is motoring. The second line, illustrated as line 120 in FIG. 2, is for negative output torque and input torque when the HEV is regenerative braking.

The non-proportional losses are calculated the same during motoring and regeneration. Therefore, line 118 and line 120 both use the same offset term b for non-proportional torque loss $T_s$. However, during regeneration, 'proportional to torque' losses are not correctly accounted for using the standard equations.

The correct $\tau_{in}$ for a given $\tau_{out}$ value is correctly computed only when the proportional torque losses are summed in the correct direction. The term in proportional loss term in Equation (3A), that is $\tau_{in}*(TR_{ideal}-TR_{actual})$, must be a positive value, regardless if the transmission is receiving negative torque during regeneration. Because $\tau_{in}$ is negative during regeneration and the proportional loss expression in Equation (3A) must be positive, the ideal torque ratio must actually be less than actual torque ratio during regeneration. Therefore, the proportional losses in the transmission actually add to the regenerative energy. This is best illustrated in the following example.

During a regenerative braking event, where the transmission input torque $\tau_{in}$ is −100 Nm, the actual torque ratio is 4.2, the ideal torque ratio, being less than the actual ratio, is 4.1, and non-proportional loss $T_s$ is 5, $\tau_{out}$ can be determined as follows:

$$\tau_{out}=(-100*4.1)-5-(-100*(4.1-4.2))=-425 \text{ Nm} \text{ Using Equation (3A)}$$

$$\tau_{out}=(-100*4.2)-5=-425 \text{ Nm} \quad \text{Using Equation (3A)}$$

Using an input speed of 400 rad/sec, we can determine the power calculation:

$$P_{in}=-100*400=-40,000 \text{ Watts}$$

$$P_{out}=-425*(400/4.1)=-41,463 \text{ Watts}$$

$$P_{in}-P_{out}=P_{loss}=1463$$

When the output torque and input torque are both positive the actual measured slope is less than the ideal torque ratio. However, when the output torque and input torque are both negative, the actual measured slope, or $TR_{actual}$ is greater than the mechanical torque ratio, or $TR_{ideal}$. The actual torque ratio for negative torque is measured to be 4.2. If the measured positive torque ratio of 4.0 is used for the negative torque situation, then Equation (3) will calculate that more energy is being collected at the transmission input 60 than is being input into the transmission output 62 during regeneration.

To account for the difference in the actual torque ratio and ideal torque ratio, the a proportional loss coefficient C1 is calculated for each gear using the following formula:

$$C1=\tau_{in}*(TR_{ideal}-TR_{actual}) \quad \text{Equation (4)}$$

During motoring, the proportional loss coefficient C1 is included in Equation (3B) to derive the loss equation as follows:

$$\tau_{out}=(\tau_{in}*(TR_{actual}-C1)-T_s \quad \text{Equation (5)}$$

Conversely, based on a desired torque output $\tau_{out}$, in order to derive the required torque in $\tau_{in}$ during motoring, the following equation applies:

$$\tau_{in}=(\tau_{out}+T_s)/(TR_{ideal}-C1) \quad \text{Equation (6)}$$

During a regenerative braking event, when the torque values are negative, the actual torque ratio is greater than the ideal torque ratio by the same amount that the ideal torque ratio is greater than the actual torque ratio during motoring. Therefore, the sign of C1 changes during regenerative braking. During regeneration, Equation (6) is modified so that C1 is positive, as follows:

$$\tau_{in}=(\tau_{out}+T_s)/(TR_{ideal}+C1) \quad \text{Equation (7)}$$

Therefore, the transmission is better characterized by two lines to differentiate between the different torque ration during motoring and regeneration. Line 120 in FIG. 2 illustrates the line accounting for proportional losses which add to regenerative braking. Line 120 can be characterized instead by the equation:

$$\tau_{out}=(\tau_{in}*(TR_{ideal}+C1))-T_s \quad \text{Equation (8)}$$

Now the inclusion of a torque converter, pump losses, and dynamic inertia losses can easily be consistent across the transmission controls development process. For example, when the vehicle includes a torque converter 56, the torque input $\tau_{in}$ when the vehicle is motorizing may be determined from the following equation:

$$\tau_{in}=((\tau_{out}+T_s)/(TR_{ideal}-C1))*(1/TR_{torque\_converter}) \quad \text{Equation (9)}$$

When the M/G 14 is generating or when the vehicle is regenerative braking such that the transmission output torque is negative, Equation (9) is modified so that the torque input $\tau_{in}$ may be determined from the following equation:

$$\tau_{in}=((\tau_{out}+T_s)/(TR_{ideal}+C1))*(1/TR_{torque\_converter}) \quad \text{Equation (10)}$$

The torque converter 56 may be connected between the M/G 14 and the transmission 24. The torque converter 56 may also be included in the transmission 24. When the torque converter 56 is locked, the torque ratio of torque converter 1:1.

Figure 3:
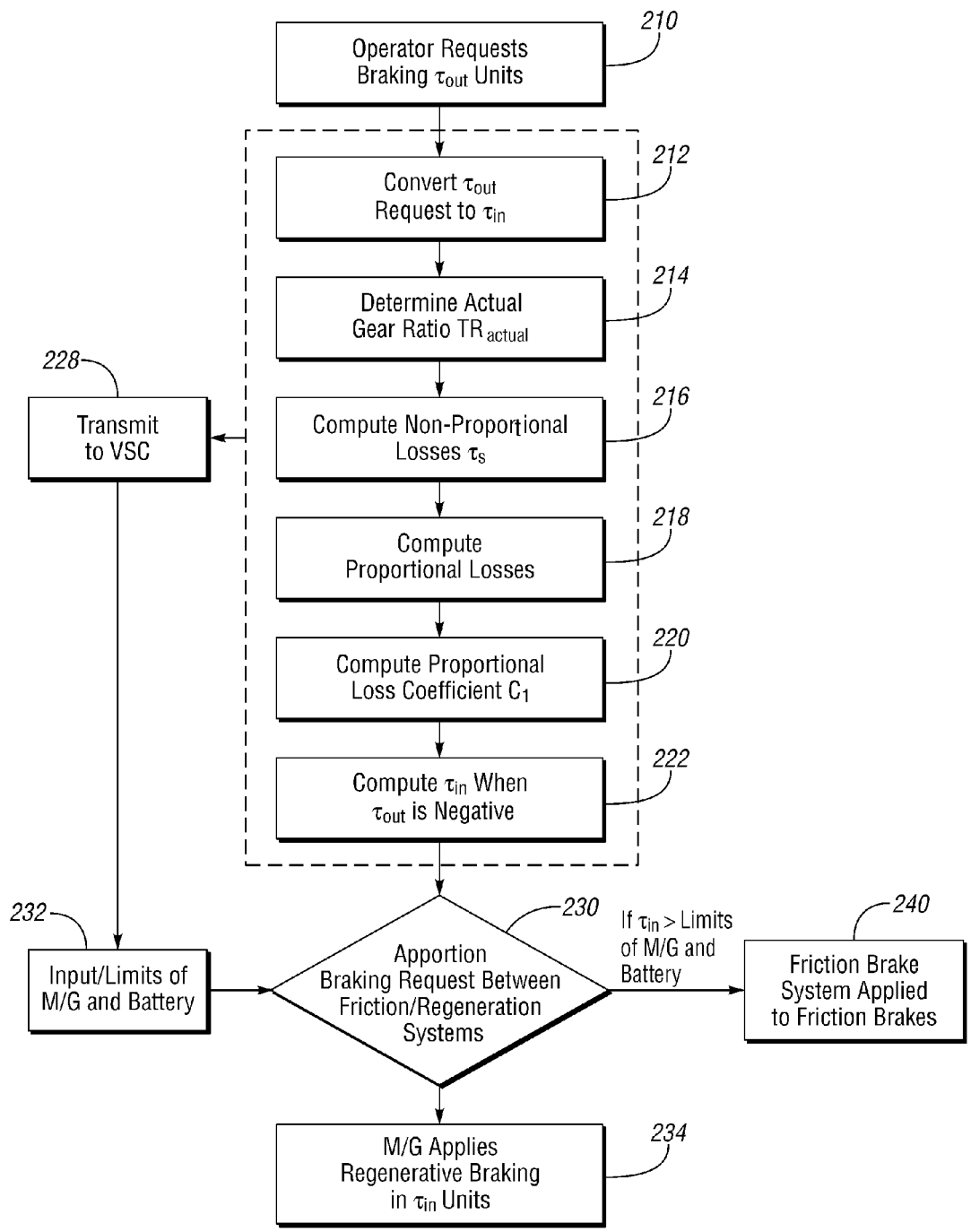
FIG. 3 is a flowchart illustrating a method for controlling the hybrid vehicle during regenerative powertrain braking according to an embodiment of the disclosure.

FIG. 3 is a flowchart illustrating a method for controlling the hybrid vehicle during regenerative powertrain braking according to an embodiment of the disclosure. As those of ordinary skill in the art will understand, the functions represented by the flowchart may be performed by hardware and/or software. Depending on the particular processing strategy, such as event driven, interrupt driven, etc., the various functions may be performed in an order or sequence other than that illustrated in FIG. 3. Likewise, one or more steps or functions may be repeatedly performed although not explicitly illustrated. Similarly, one or more of the steps or functions illustrated may be omitted in some applications or implementations. In one embodiment, the functions illustrated are primarily implemented by software instructions, code, or control logic stored in a computer-readable storage medium and executed by a microprocessor based computer or controller to control operation of the vehicle, such as the VSC 40 or the brake controller 42 (FIG. 1).

During regenerative powertrain braking in a HEV, the driver requests a braking event in $\tau_{out}$ units, as represented by block 210. Electronic throttle control systems, replaced the traditional mechanical throttle cable system with an "electronic linkage" provided by sensors and actuators in communication with an electronic controller. This allows control of the powertrain independent of the accelerator pedal 52 position. Driver inputs may be assessed by pedal position sensors in communication with the brake pedal 50 or accelerator pedal 52, to determine the driver's intent to apply the brakes or intent to provide positive wheel torque. The driver's braking request may also be assessed from inputs as brake pedal force, accelerator position, gear position, and other variables known to those skilled in the art. In the electronic throttle control system, the driver's braking request is provided in units based on desired $\tau_{out}$. Alternatively, the driver's request for braking may also include determining another output parameter which is then converted or used to determine the desired $\tau_{out}$.

First, the controller converts $\tau_{out}$ to $\tau_{in}$ based on the ideal torque ratio of the transmission, as represented by block 212. Next, the controllers determine the value for the current gear, or alternatively the actual torque ratio, as represented by block 214. The actual torque ratio may be stored in a lookup table which corresponds to the current gear, or corresponds to whether the vehicle is motoring or regenerative powertrain braking, as described above.

The actual torque ratio is used with the transmission speeds, either estimated or actual, to determine the non-proportional loss, as represented by block 216. The non-proportional loss values may stored in a lookup table which corresponds to the current gear and is accessed or indexed by the transmission speeds, as described above.

The controller determines the torque proportional loss, as represented by block 218 of FIG. 3. The proportional loss values may also be stored in a lookup table with a separate set of values for each of the available gears or torque ratios, as well as negative torque values or positive torque values.

Block 220 represents determination of a proportional loss coefficient based on the currently selected gear. This factor may be used to fine-tune or calibrate the engine torque determination for any additional losses which may not be included in the torque loss terms described above.

The controller then determines $\tau_{in}$ is based on the transmission losses, including non-proportional losses and torque proportional losses when the vehicle is regenerative powertrain braking, so that $\tau_{out}$ is negative, as represented by block 222. In accounting for losses, the controller may also consider pump loss, gear ratio, final drive ratio, converter multiplication, and scaling factor or any other system losses which effect computing $\tau_{in}$, as represented in block 222.

In one embodiment, the brake controller 42 may perform the steps or functions described in blocks 212 through 222. The brake controller 42 may communicate the data to the VSC 40, as represented by block 228, for coordination with the engine 12 and transmission 24, as necessary.

Next, the controller apportions the braking request between the friction braking system and regenerative powertrain braking system, as represented by block 320. The controller may apportion the braking request based on a maximum regenerative powertrain braking limit and inputs of the M/G 14 and battery 32, as represented by block 232. The regenerative powertrain braking limits, the M/G inputs and the battery inputs may be based upon system considerations, such as the temperature of the battery, state of charge of the battery and other system parameters known to those skilled in the art and suggested by this disclosure.

The regenerative powertrain braking limits, the M/G inputs and the battery inputs may also be influenced by the regenerative powertrain braking functions in steps 212 through 222. The regenerative powertrain braking functions in steps 212 through 222 allow the controller to accurately account for the proportional losses in the transmission and increase accuracy of regenerative powertrain braking torque calculations. Therefore, the friction brake system may be applied later, as shown in block 240, and the M/G may apply regenerative powertrain braking longer, as shown in block 234.

The controller applies regenerative powertrain braking torque in $\tau_{in}$ units, as represented by block 234. The controller applies regenerative powertrain braking as long as the limits of the regenerative powertrain braking system, including the M/G and battery, are within a threshold capacity. The threshold capacity of the regenerative powertrain braking system may be based on the state of charge of the battery, the torque capacity of the M/G, the quantity of the braking request or any other parameters known to those skilled in the art and suggested by this disclosure.

Once the capacity of the regenerative powertrain braking system is exceeded, the controller may apply the friction braking system to fulfill the braking request, as represented by block 240.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A hybrid-electric vehicle control system comprising:
   a brake controller adapted to cause, for a selected transmission gear, a first torque ratio to be applied to a regenerative brake system during regenerative braking and a second torque ratio different from the first torque ratio to be applied otherwise,
   wherein application of the first torque ratio results in an increased braking torque generated by the regenerative brake system compared with application of the second torque ratio.

2. The control system according to claim 1 wherein the regenerative brake system comprises a powertrain regenerative brake system including an electric machine and a transmission adapted to apply the braking torque.

3. The control system according to claim 2 wherein the electric machine is mechanically coupled to the transmission such that the transmission is in-line with the electric machine.

4. The control system according to claim 2 wherein the powertrain regenerative brake system further includes a battery connected to the electric machine such that the battery stores regenerative energy collected by the electric machine, wherein application of the first torque ratio increases an amount of regenerative energy collected when the electric machine is generating.

5. The control system according to claim 2 wherein the powertrain regenerative brake system further includes a torque converter connected between the electric machine and the transmission, wherein for the selected gear of the transmission, while the torque converter is locked, the transmission is configured to produce the first torque ratio when the electric machine is generating, and to produce the second torque ratio when the electric machine is motoring.

6. The control system according to claim 5 wherein the torque converter is mechanically coupled to and included in the transmission.

7. The control system according to claim 1 wherein the brake controller is adapted to apply the first torque ratio when a commanded transmission output torque is negative and adapted to apply the second torque ratio when the commanded transmission output torque is positive.

8. The control system according to claim 1 wherein the first torque ratio is greater than the second torque ratio.

9. The control system according to claim 1 further comprising a friction brake system coupled to road wheels, wherein the brake controller allocates a braking request between the regenerative brake system and the friction brake system when the braking request exceeds a capacity of the regenerative brake system.

\* \* \* \* \*